(12) United States Patent
Perisic

(10) Patent No.: US 7,988,296 B2
(45) Date of Patent: Aug. 2, 2011

(54) APPARATUS FOR PROJECTING TWO-DIMENSIONAL IMAGES AS PAIRS OF PSEUDO-STEREOSCOPIC IMAGES

(76) Inventor: Zoran Perisic, Sherman Oaks, CA (US)

( * ) Notice: Subject to any disclaimer, the term of this patent is extended or adjusted under 35 U.S.C. 154(b) by 285 days.

(21) Appl. No.: 12/179,586

(22) Filed: Jul. 25, 2008

(65) Prior Publication Data

US 2010/0020287 A1    Jan. 28, 2010

(51) Int. Cl.
   G03B 21/00     (2006.01)
   H04N 13/00     (2006.01)
   G02B 27/22     (2006.01)
(52) U.S. Cl. ............................. 353/10; 348/44; 359/478
(58) Field of Classification Search ............... 353/7–10, 353/20, 6; 348/44, 49; 359/464, 465, 478, 359/479
   See application file for complete search history.

(56) References Cited

U.S. PATENT DOCUMENTS

| 3,891,313 A * | 6/1975 | Murphy ........................... 353/8 |
| 4,082,440 A * | 4/1978 | Bennett ......................... 353/26 R |
| 6,864,910 B1 * | 3/2005 | Ogino et al. ..................... 348/42 |

FOREIGN PATENT DOCUMENTS

JP              63113414 A  *  5/1988

* cited by examiner

Primary Examiner — Thanh X Luu

(57) ABSTRACT

An apparatus for creating two identical images with matching geometry and luminosity from a single two-dimensional image or series of moving images whereby they may be projected simultaneously or sequentially along two axis at substantially equal focal distance from the projection screen by a single film or digital projector as a pseudo-stereoscopic pair of images.

1 Claim, 2 Drawing Sheets

Figure 1:
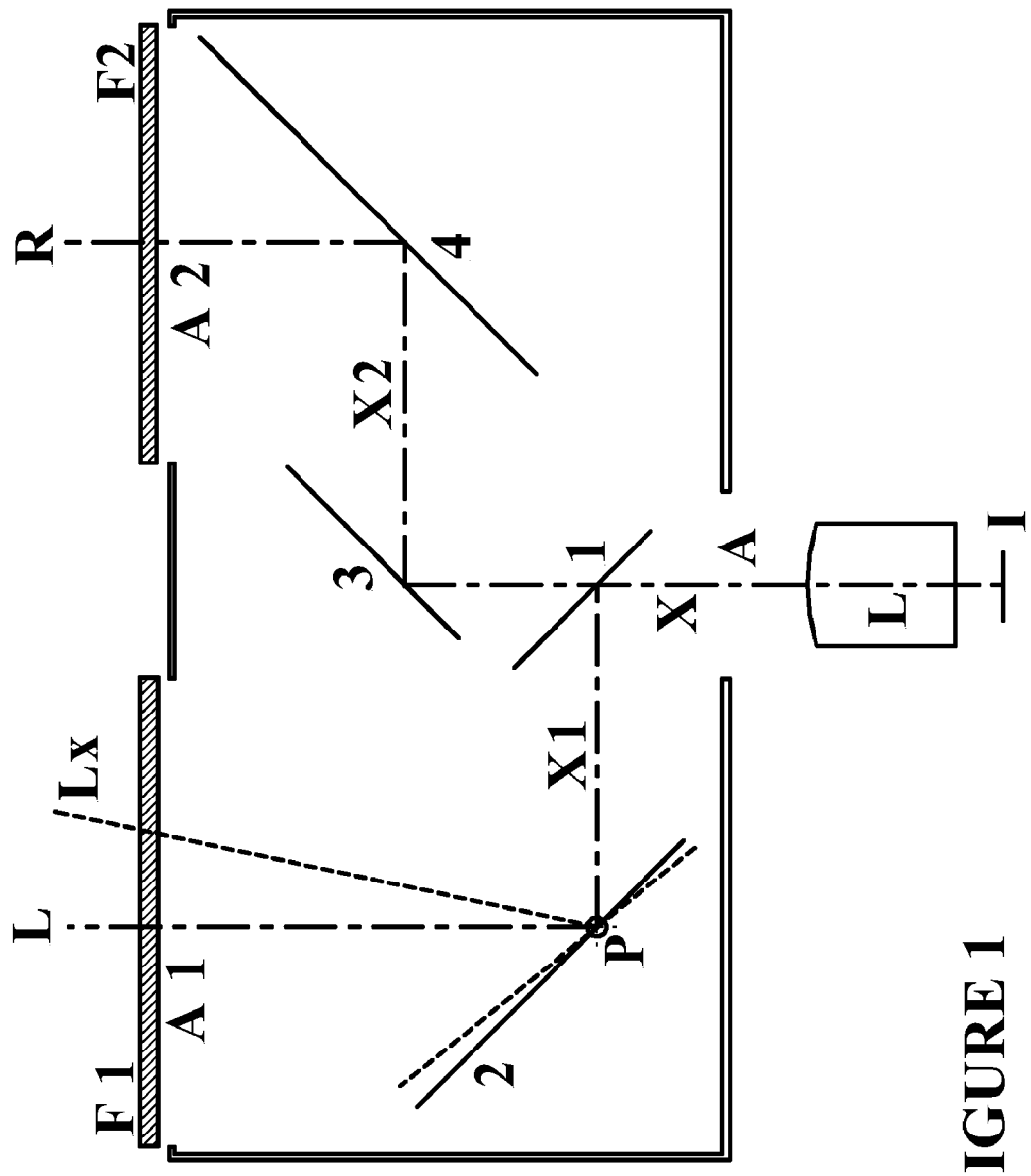

APPARATUS FOR PROJECTING TWO-DIMENSIONAL IMAGES AS PAIRS OF PSEUDO-STEREOSCOPIC IMAGES

The present invention relates to an apparatus for creating two identical images with matching geometry and luminosity from a single two-dimensional image or series of moving images whereby they may be projected simultaneously by a single film or digital projector as a pseudo-stereoscopic pair of images as described previously in my provisional patent application No. 60952806 filed on 30-Jul. 2007. (EFS ID 2027249; Confirmation Number 3187)

BACKGROUND

True three-dimensional imaging in photography, cinematography and videography is achieved by recording separate left and right eye images of a scene with the viewpoints of the said left and right images separated along the horizontal plane in the manner of human eyes. There are a number of methods and apparatus for acquisition and projection of a stereoscopic pair of images including my own U.S. Pat. No. 6,721,500 B2 (Perisic) and U.S. Pat. No. 4,678,298 (Perisic)

The stereoscopic pair of images can be viewed by projecting them through a pair of polarizing filters onto a front projection screen, such screen being coated with a metallic surface capable of maintaining polarization. The two polarizing filters are set with their polarizing axis at 90 degrees to each other so that when the projected images are viewed through glasses with corresponding polarization, the left eye sees only the image acquired from the left viewpoint and the right eye sees only the images acquired from the right viewpoint. The resultant effect has genuine depth within the scene which extends forward from the screen towards the viewer as well as beyond the projection screen, which is perceived as a window. Objects within the scene can appear to float in space between the viewer and the screen. The extent of the three dimensional depth can be controlled by varying the convergence angle between the axis of the two images and is best done during acquisition although it can also be done in projection to a limited degree.

When a pair of identical two-dimensional images are projected in place of a true stereo pair, in the same manner as described above, the resultant effect is an increased perception of depth within the scene, commonly referred to as pseudo 3D. The depth in pseudo 3D extends only beyond the screen; objects within the image cannot be made to appear forward of the projection screen.

The extent of the apparent depth in pseudo 3D can be controlled by varying the amount of overlap of the left and right images in the horizontal plane. This is accomplished by altering the angle of convergence between the projection axis of the two images. The angle of view and subject matter of the original two dimensional image are some of the factors contributing to the effectiveness of a pseudo three-dimensional scene. Consequently different scenes may require different convergence settings in order to achieve the optimum result.

The simplest way to achieve a pseudo 3D effect is to use two projectors and two identical copies of the image. A more sophisticated approach is to make a duplicate copy, with appropriate sideways shift built in, so that the two images can be projected as a pseudo three-dimensional pair by means of existing digital stereoscopic projection systems such as Real D.

It would therefore be advantageous to provide an apparatus for creating a pair of pseudo three-dimensional images from a single two-dimensional image or series of images during projection with a single projector.

DESCRIPTION

According to a first aspect of the present invention there is provided an apparatus for creating two identical images with matching geometry and luminosity from a single two-dimensional image or series of moving images whereby they may be projected simultaneously or sequentially along two axis at substantially equal focal distance from the projection screen by a single film or digital projector as a pseudo-stereoscopic pair of images.

Preferably, the optical means comprises a first optical element in the form of a two-way mirror positioned substantially at 45 degrees to the optical axis of the projection lens and arranged to reflect approximately 50% of the luminous value of the projected light at substantially 90 degrees to the principal projection axis, and to transmit the remaining 50% of light along the said principal projection axis.

Preferably the optical means comprises a second optical element set substantially parallel to the first optical element and at substantially 45 degrees to the reflected projection axis, to reflect the projected image beam along an axis substantially parallel to the direction of the principal projection axis.

Preferably the optical means comprises a third optical element set at substantially 45 degrees to the principal projection axis, after transmission through the first optical element, and arranged to reflect the said principal projection axis at 90 degrees in the opposite direction to the projection axis reflected by the first element.

Preferably the optical means comprises a fourth optical element set substantially parallel to the third optical element and set at 45 degrees to the projection axis reflected by the third element, to reflect the said projection axis at substantially 90 degrees, making it substantially parallel to the direction of the original projection axis.

Preferably, the optical means also comprises two polarizing filters positioned in the path of the projection axis of each pseudo-stereoscopic image, and set at the angle of maximum extinction relative to each other. The polarizing pair of filters may be of either linear or circular type.

Preferably, the apparatus also comprises convergence adjustment means, wherein the convergence of the two axis can be adjusted relative to each other. Preferably, the convergence adjustment means comprises an adjustment mechanism for adjusting the angle of the second optical element in relation to the first optical element. Additionally or alternatively the adjustment mechanism may comprise a mechanism for adjusting the angle at which the fourth optical element is set in relation to the third.

Preferably the convergence adjustment means may comprise an adjustment mechanism operated manually or remotely by means of a servo motor and encoder unit. Additionally the adjustment mechanism may be coupled to an electronic controller to provide recording and playback of pre-set convergence positions synchronized to a timing signal in the form of a time code running alongside the moving image in much the same way as in the case of soundtrack reproduction systems in common usage for film and digital projection such as DTS. The encoded convergence information may be stored on the same media as the moving image or on a portable media and accessed by means of an electronic device synchronized to the time code for play back.

Preferably the apparatus comprises a protective enclosure with one entrance and two exit apertures and a facility for mounting the said enclosure in front of a projection lens.

An embodiment of the present invention will now be described, by way of example only, with reference to the accompanying figures, in which:

FIG. 1 schematically illustrates the primary optical arrangement of the apparatus according to an embodiment of the present invention.

Image I is projected by lens L along axis X towards the first optical element 1 comprising a plane two-way mirror, through aperture A. The reflected image travels along axis X1 towards the second optical element 2 comprising a front-surface plane mirror set substantially parallel to the first optical element and is reflected towards aperture A1, passing through polarizing filter F1 and exiting from the apparatus as the Left Eye Image L.

Projected image traveling along lens axis X continues through the first optical element 1 towards the third optical element 3 comprising a front surface plane mirror and is reflected along axis X2 towards the fourth optical element comprising a front-surface plane mirror set substantially parallel to the third optical element and is reflected again towards aperture A2, passing through polarizing filter F2 and exiting the apparatus as the Right Hand Image R.

The Second optical element comprising plane front-surface mirror 2 pivots at point P to reflect the Left Eye Image Lx to converge with the Right Eye Image R on the projection screen.

Figure 2:
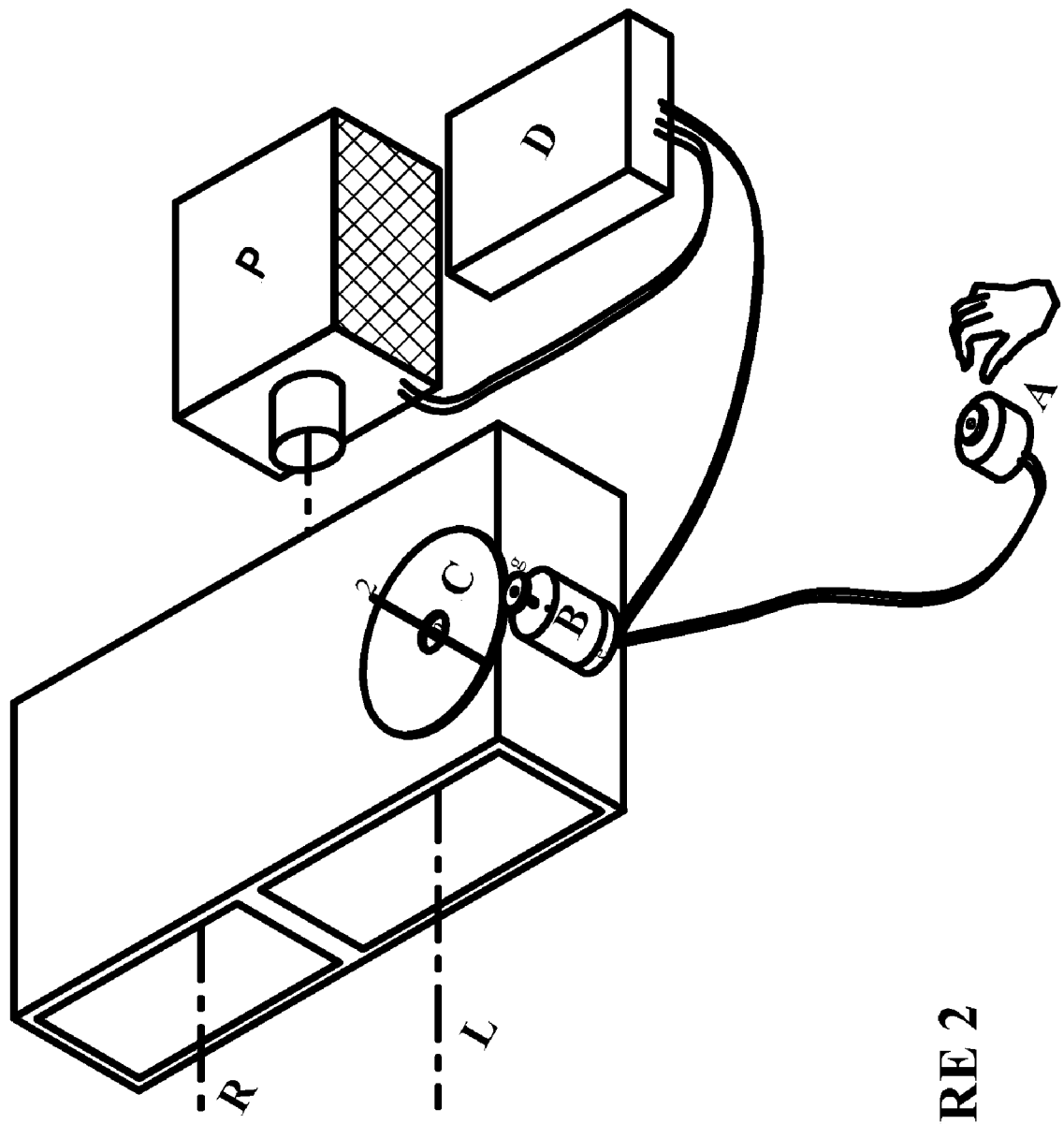

FIG. 2 schematically illustrates the primary servo control arrangement of the apparatus for recording and playback of convergence settings in projection of moving pictures according to an embodiment of the present invention.

Positional encoder A controls servo motor B via the built-in positional encoder "e".

Gear C is driven by servo motor B via smaller gear "g". The frame supporting the second element 2 is attached to gear C enabling it to pivot at point "pp".

Positional information from encoder "e" and/or encoder A is transmitted to a micro processor/Controller D and recorded simultaneously and in synchronization with the time code from the moving image transmitted by projector P. In playback mode the servo motor B is driven by controller D to replicate the convergence positions for each scene relative to, and in synchronization with, the time code transmitted by the projector.

What is claimed is:

1. A stereoscopic attachment for a projection lens for providing left and right eye images as a pair of pseudo-stereoscopic images from a single two-dimensional image or series of two-dimensional moving images, the apparatus comprising:

optical means arranged to provide said left and right images as a pair of substantially identical images with matching geometry and luminosity such that said left and right eye images are simultaneously projected by a single film or digital projector;

said optical means including a first optical element comprising a semi-reflective plane mirror being located along the optical axis of the projection lens of said film or digital projector and arranged to reflect the two-dimensional image being projected by said projection lens at an angle of 90 degrees at approximately 50% of the luminous value and transmit said two-dimensional image being projected by said projection lens along said optical axis of the projection lens at approximately 50% of the luminous value;

said optical means including a second optical element comprising a plane mirror being positioned parallel to the first optical element and arranged to receive the two-dimensional image being projected by said projection lens and reflected by said first optical element, and reflect said two-dimensional image being projected by said projection lens to a viewing screen at a variable angle of approximately 90 degrees;

said optical means including a third optical element comprising a plane mirror being located along said optical axis of the projection lens and arranged to receive said two-dimensional image being projected by said projection lens and transmitted by the first optical element, and reflect said two-dimensional image at an angle of 90 degrees in the opposite direction to said two-dimensional image being projected by said projection lens and reflected by said first optical element;

said optical means including a fourth optical element comprising a plane mirror being positioned parallel to the third optical element and arranged to receive the two-dimensional image being projected by said projection lens and reflected by said third element and reflect said two-dimensional image being projected by said projection lens to the viewing screen at a variable angle of approximately 90 degrees;

said optical means further comprising a linear or circular polarizing filter being located along the optical axis of said two-dimensional image being projected by said projection lens and reflected by the first optical element and a second linear or circular polarizing filter arranged to have the opposite polarity to said first linear or circular polarizing filter and being located along the optical axis of said two-dimensional image being projected by said projection lens and transmitted by the first optical element;

the apparatus also includes convergence adjustment means comprising a mechanism for varying the angle of convergence of the optical axis of said two-dimensional image being projected by said projection lens and reflected by the first optical element and the optical axis of said two-dimensional image being projected by said projection lens and transmitted by the first optical element;

said mechanism for varying the angle of convergence includes a means for rotating said second optical element comprising a plane mirror in the horizontal plane arranged to have the center of rotation on the optical axis of the two-dimensional image being projected by said projection lens and reflected by said first optical element;

said mechanism for varying the angle of convergence includes a means for rotating said fourth optical element comprising a plane mirror in the horizontal plane arranged to have the center of rotation on the optical axis of the two-dimensional image being projected by said projection lens and transmitted by said first optical element;

said mechanism for varying the angle of convergence includes a means for adjusting said angle of convergence manually;

said convergence adjustment means includes a mechanism for adjusting said angle of convergence remotely by means of a servo motor and encoder unit;

said convergence adjustment means also includes a mechanism for adjusting said angle of convergence by computerized control of said servo motor and encoder unit to provide recording and playback of said angle of convergence in synchronization with the projected image.

* * * * *